(12) United States Patent
Polmans

(10) Patent No.: US 11,192,581 B2
(45) Date of Patent: Dec. 7, 2021

(54) CONTROLLING A STEER-BY-WIRE STEERING SYSTEM

(71) Applicants: THYSSENKRUPP PRESTA AG, Eschen (LI); thyssenkrupp AG, Essen (DE)

(72) Inventor: Kristof Polmans, Tarrenz (AT)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 286 days.

(21) Appl. No.: 16/324,050

(22) PCT Filed: Aug. 8, 2017

(86) PCT No.: PCT/EP2017/070079
§ 371 (c)(1),
(2) Date: Feb. 7, 2019

(87) PCT Pub. No.: WO2018/029198
PCT Pub. Date: Feb. 15, 2018

(65) Prior Publication Data
US 2019/0168807 A1 Jun. 6, 2019

(30) Foreign Application Priority Data
Aug. 10, 2016 (DE) .................... 10 2016 009 684.5

(51) Int. Cl.
*B62D 6/00* (2006.01)
*B62D 5/00* (2006.01)
(Continued)

(52) U.S. Cl.
CPC ............ *B62D 6/008* (2013.01); *B62D 5/006* (2013.01); *B62D 5/0484* (2013.01); *B62D 3/12* (2013.01); *B62D 15/021* (2013.01)

(58) Field of Classification Search
CPC ........ B62D 15/021; B62D 3/12; B62D 5/006; B62D 5/0484; B62D 6/008
See application file for complete search history.

(56) References Cited

U.S. PATENT DOCUMENTS 7,302,328 B2 * 11/2007 Kato .................... B60T 8/1764
180/443
9,043,091 B2 * 5/2015 Hayama ............... B62D 15/021
701/43
(Continued)

FOREIGN PATENT DOCUMENTS

CN 101096214 A 1/2008
CN 101213126 A 7/2008
(Continued)

OTHER PUBLICATIONS

English Translation of International Search Report issued in PCT/EP2017/070079, dated Nov. 20, 2017.
English abstract of JP2017081379A.

*Primary Examiner* — Behrang Badii
*Assistant Examiner* — Daniel L Greene
(74) *Attorney, Agent, or Firm* — thyssennkrupp North America, LLC

(57) ABSTRACT

A vehicle steering system includes a steering actuator which acts on steered wheels, an actuation unit, a feedback actuator to which a user request for a steering angle can be applied using a steering input means, which outputs a feedback signal to the steering input means in response to the request and a driving state of the vehicle. A signal transmission transfers the request to the actuation unit. The actuation unit actuates the steering actuator to deflect the wheels. When a monitor detects a malfunction of the feedback actuator as a fault situation, the feedback signal and the signal transmission is modified or generated according to multiple options.

9 Claims, 2 Drawing Sheets

(51) Int. Cl.
*B62D 5/04*  (2006.01)
*B62D 3/12*  (2006.01)
*B62D 15/02* (2006.01)

(56) References Cited

U.S. PATENT DOCUMENTS

| | | | |
|---|---|---|---|
| 2004/0059497 A1* | 3/2004 | Sankrithi | B64C 25/50 |
| | | | 701/120 |
| 2005/0228568 A1* | 10/2005 | Hack | B60T 8/322 |
| | | | 701/70 |
| 2006/0232052 A1* | 10/2006 | Breed | B60R 21/0132 |
| | | | 280/735 |
| 2007/0228703 A1* | 10/2007 | Breed | B60R 21/206 |
| | | | 280/735 |
| 2007/0299580 A1 | 12/2007 | Lin | |
| 2008/0066994 A1* | 3/2008 | Fujita | B62D 5/0463 |
| | | | 180/446 |
| 2008/0243342 A1* | 10/2008 | Breed | B60R 21/232 |
| | | | 701/45 |
| 2010/0044146 A1 | 2/2010 | Kasai | |
| 2013/0253773 A1 | 9/2013 | Itamoto | |
| 2016/0355211 A1* | 12/2016 | Suzuki | B62D 5/0457 |
| 2017/0113720 A1 | 4/2017 | Kodera | |

FOREIGN PATENT DOCUMENTS

| | | | | |
|---|---|---|---|---|
| CN | 100546861 C | * | 10/2009 | ............. B62D 5/049 |
| CN | 103298687 A | | 9/2013 | |
| DE | 198 38 490 A | | 12/1999 | |
| DE | 103 02 268 A | | 7/2004 | |
| JP | 2017081379 A | | 5/2017 | |
| WO | WO-2012169687 A1 | * | 12/2012 | .......... G06F 11/1654 |

\* cited by examiner

CONTROLLING A STEER-BY-WIRE STEERING SYSTEM

CROSS REFERENCE TO RELATED APPLICATIONS

This application is a U.S. National Stage Entry of International Patent Application Serial Number PCT/EP2017/070079, filed Aug. 8, 2017, which claims priority to German Patent Application No. DE 10 2016 009 684.5, filed Aug. 10, 2016, the entire contents of both of which are incorporated herein by reference.

FIELD

The present disclosure generally relates to a method for controlling a steer-by-wire steering system for motor vehicles.

BACKGROUND

In steer-by-wire steering systems the position of the steered wheels is not coupled directly to the steering input means, for example to a steering wheel. There is a connection between the steering wheel and the steered wheels by electrical signals. The driver's is preferably a steering request is tapped by a steering angle sensor, and the position of the steered wheels is controlled by means of a steering actuator as a function of the driver's steering request. A mechanical connection to the wheels is not provided, with the result that after the actuation of the steering wheel, no direct force feedback is conveyed to the driver. However, a correspondingly adapted feedback, for example when parking or when traveling straight ahead, during which a steering torque, which is adapted to the vehicle reaction and is different depending on the vehicle manufacturer, is desired as force feedback, is provided. During cornering, reaction forces act as transverse forces on the steering gear, and are simulated by the feedback actuator in the form of a torque which opposes the steering direction. The driver experiences a steering sensation which can be predefined by this means. In order to simulate the reactions of the road on the steering wheel in the case of steer-by-wire steering systems, it is necessary to provide, on the steering wheel or the steering wheel column, a feedback actuator (FBA) which impresses a steering sensation on the steering handle as a function of the desired reactions. The driver has to counteract this torque with a corresponding holding torque so that the steering lock can be controlled. In particular, during cornering a countertorque is frequently to be generated, in order to simulate steering sensations which are familiar to the driver in conventional steering systems.

If the feedback actuator fails, a fault situation is present and the torque which is generated by the feedback actuator suddenly fails, while the holding torque which is applied by the driver is applied to the steering wheel. As a result, there possibly arises a rapid, undesired movement at the steering wheel in the steering direction, which movement is interpreted as a steering lock by the steer-by-wire steering system and leads to a greater deflection of the wheels in the bend, and as a result triggers an undesired reaction by the vehicle. If no fault situation is present, the state is referred to as a normal situation.

Conventionally, such an undesired reaction by the vehicle is prohibited by a fallback level being provided which is activated when the feedback actuator fails. A hydraulic fallback level is known, for example, from DE 198 38 490 A1. In the emergency steering mode, for example in the event of faults or a failure of a steering actuator, of an encoder or of the control system, the effective connection between the steering wheel and the steered wheels is established by means of a closed hydraulic circuit. A hydraulic emergency mode proves disadvantageous as a result of an unfamiliar steering sensation, the risk of leakages and oil losses, as well as a result of the temperature dependence of the hydraulic oils.

Thus a need exists for a method for controlling a steer-by-wire steering system for motor vehicles which brings about an improved steering behavior in the event of a fault. Furthermore, a steer-by-wire steering system which permits an improved steering behavior is to be specified.

DETAILED DESCRIPTION

Figure 1:
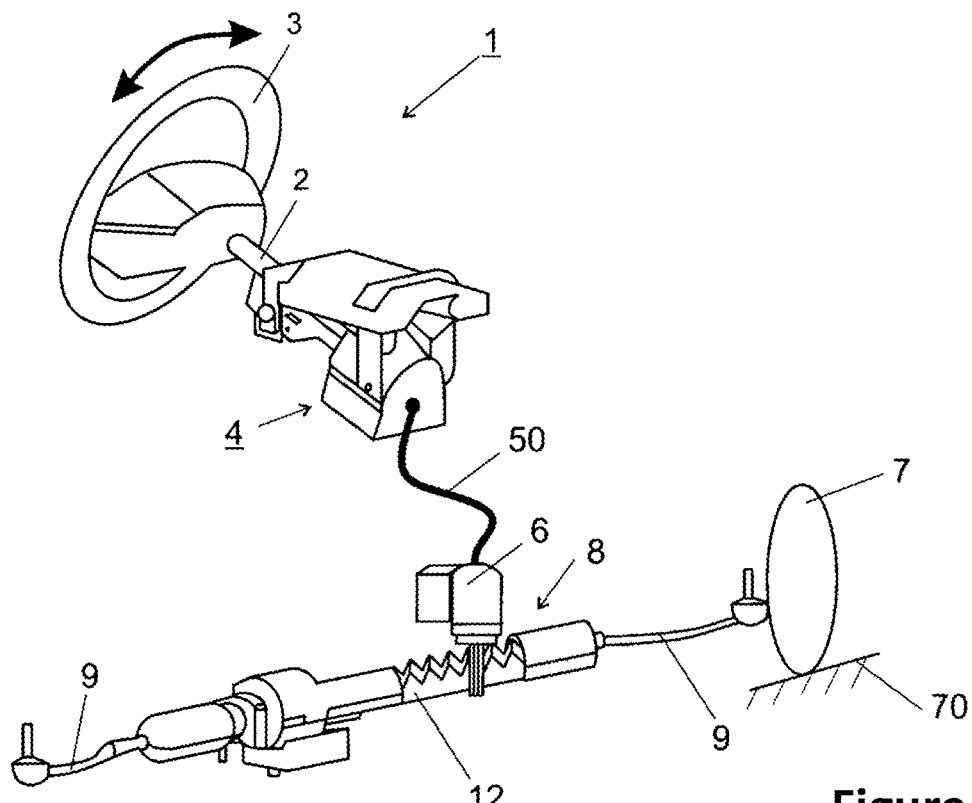
FIG. 1 is a schematic view of a steer-by-wire steering system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention relates to a method for controlling a steer-by-wire steering system for motor vehicles.

Accordingly, a method is provided for controlling a steer-by-wire steering system for a motor vehicle, comprising: an electronically controllable steering actuator which acts on the steered wheels, an actuation unit, a feedback actuator to which a driver's request for a steering angle can be applied by a driver using a steering input means, and which outputs a feedback signal to the steering input means as a reaction to the driver's request and a driving state of the motor vehicle, a signal transmission which transfers the driver's request to the actuation unit, wherein the actuation unit actuates the steering actuator in order to transform the driver's request into a deflection of the steered wheels, wherein a feedback actuator monitor unit is provided which detects a malfunction of the feedback actuator as a fault situation, wherein in the event of a fault of the feedback actuator, the following method steps are provided:
  the feedback signal to the steering input means is continuously reduced to zero within a first time period, and
  the signal transmission is reduced, and/or the signal transmission is interrupted for a second time period, and/or the driver's request which is transferred in the signal transmission is only included as a reduced variable in the transformation for determining the change in the deflection of the wheels, and/or the driver's request which is transferred in the signal transmission, for the second time period, is not included in the transformation for determining the change in the deflection of the wheels.

The second time period is preferably shorter than the first time period.

Such a control can make it possible, for many cases, that after the fault situation of the feedback actuator occurs, the driver continues to receive feedback about the reactions of the road at the steering input means. This force feedback preferably decreases over time and approaches zero, with the result that after the expiry of the first time period a virtually imperceptible steering sensation is conveyed to the driver, and the feedback actuator is switched off. For the time sequence, periods in the range from 0 seconds up to 5 seconds after the occurrence of the fault situation have proven expedient for the first time period. More preferably, first time periods from 0 up to 10 seconds prove advantageous. While the feedback signal is being reduced, the steering angle which is applied by the driver and/or the holding torque which is applied by the driver are only partially input into the control, or only input with an influence which is reduced compared to the normal situation, with the result that an overreaction by the driver can be damped.

Alternatively, depending on the driving situation and/or the type of the fault state of feedback actuator, the transmission of the steering angle which is applied by the driver and/or of the holding torque which is applied by the driver is interrupted for a second time period, with the result that an overreaction by the driver is not transmitted directly.

For the time sequence, periods in the range from 0 seconds up to 2 seconds prove expedient for the second time period. Second time periods from 0 to 3 seconds are more preferred. Time periods from 0 to 4 seconds or 5 seconds or 6 seconds can also prove advantageous for interrupting the steering input applied by the driver (steering angle and/or steering torque). It can also prove advantageous to implement the second time period up to 10 seconds.

The following method steps are also preferably provided:

determining a defined steering angle status on the basis of the steering angle and a steering angle speed which are applied by the driver during travel, transmitting the defined steering angle status to the actuation unit, and actuating the steering actuator on the basis of the defined steering angle status.

The defined steering angle status describes a period in which the steering commands which are applied by the driver during travel, that is to say the steering angle, steering angle speed and/or steering angle acceleration, are determined and stored. It is also preferred if the defined steering angle status is subdivided into a first steering angle status and a second steering angle status. The first steering angle status determines the steering angles which are applied before the fault situation, that is to say in the normal situation, during a time period, that is to say a first steering angle profile and possibly further variables which describe the steering behavior. The second steering angle status determines the steering angles which are applied during a time period after the occurrence of the fault situation, that is to say a second steering angle profile as well as possibly further variables which describe the steering behavior. A progressive actuation of the steering actuator is particularly preferably made available from the first steering angle status. The second steering angle status is preferably not used for actuating the steering actuator in order to prohibit faulty deflection of the wheels.

It is however conceivable and possible to use the second steering angle status to actuate the steering actuator in reduced form. This can be carried out, for example, when the fault situation can be precisely localized, and it can be correspondingly detected that certain limited functions of the feedback actuator are still present.

The following method steps are also preferably provided:

measuring and storing a vehicle velocity, and/or measuring and storing the steered angle of the steered wheels, and/or measuring and storing a position of the steering actuator, and/or measuring or estimating a force of the steering actuator, wherein the force of the steering actuator is stored, wherein the stored values are stored for a third time period and actuating the steering actuator on the basis:

of the stored vehicle velocity and/or of the stored steered angle and/or of the stored position of the steering actuator and/or of the stored or estimated force of the steering actuator.

These variables make it possible to determine the driving state or the steering behavior of the vehicle. In addition, for example, the velocity of the motor vehicle, the acceleration of the motor vehicle, the yaw rate, the Ackermann angle, the toe and/or the caster can serve as variables which describe the steering behavior of the vehicle and/or the driving state.

However, it is also conceivable and possible, for improved determination of the driving state or of the steering behavior of the vehicle, to use the steering commands induced by the driver, such as, for example, the steering angle, the steering angle speed, the steering angle acceleration and/or a holding force which is applied to the steering wheel by the driver.

On the basis of the determined variables, the steering actuator can be actuated further both in the normal situation and in the fault situation and steers the wheels in a preferred way independently of the signals of the feedback actuator monitor unit, and therefore independently of the driver's request. The determined variables are transferred to the feedback actuator monitor unit by means of a signal transmission, with the result that a feedback signal is transmitted to the steering input means both in the normal situation and in the fault situation. For the time profile, periods from 0 seconds up to 15 seconds prove advantageous for the third time period.

In one advantageous embodiment, the following method steps are also provided:

In the fault situation:

determining the feedback signal and/or the driver's request on the basis of the steering angle status which is determined before the fault situation and/or the measured vehicle velocity (V) and/or the measured steered angle of the measured position of the steering actuator and/or of the measured or estimated force of the steering actuator.

As a result it can be ensured that a certain driving sensation and the reactions of the road are conveyed to the driver even in a fault situation of the feedback actuator or of the signal processing or signal transmission with respect to the feedback actuator, as a result of which an overreaction on the part of the driver can be damped. The actuation unit preferably stores the steering angle status which is determined before the fault situation, information of the steering actuator and input variables which can be transmitted into the actuation of the wheels after the occurrence of the fault situation.

In one preferred embodiment, after the expiry of the first time period, the feedback actuator is actuated by means of the actuation unit. As a result, a driving sensation is simulated to the driver even in the malfunction of the feedback actuator, as a result of which abrupt steering movements of the driver can be reduced, to the extent that that is still possible in the respective fault state.

In the event of the driving state of the vehicle corresponding to cornering, the steering actuator is actuated in the fault situation on the basis of the steering angle status determined before the fault situation and/or of the steering angle status measured in the fault situation and/or of the steering behavior, determined before the fault situation, of the vehicle. A movement of the motor vehicle with a steering angle which is unequal to the value of zero with simultaneous occurrence of transverse forces whose magnitude is no longer negligible is to be understood as cornering. In the case of parking, the velocity is, on the other hand, so low that the transverse forces can be neglected. In the event of the fault situation having occurred and parking currently taking place, distance sensors, parking aids and/or camera signals can be used to actuate the steering actuator.

Furthermore, a steer-by-wire steering system for a motor vehicle is provided, comprising:
an electronically controllable steering actuator which acts on the steered wheels, an actuation unit, a feedback actuator to which a driver's request for a steering angle can be applied by a driver using a steering input means, and which outputs a feedback signal to the steering input means as a reaction to the driver's request and a driving state of the motor vehicle, a signal transmission device which transfers the driver's request to the actuation unit, wherein the actuation unit actuates the steering actuator in order to transform the driver's request into a deflection of the steered wheels, wherein a feedback actuator monitor unit is provided which monitors the feedback actuator and detects a malfunction of the feedback actuator as the fault situation, wherein the feedback actuator monitor unit is configured to reduce, in the fault situation, the feedback signal to the steering input means continuously to zero within a first time period, and the signal transmission device is configured to reduce the signal transmission between the steering input means and the steering actuator, and/or to interrupt the signal transmission for a second time period, and/or to transmit the driver's request, transferred in the signal transmission, only as a reduced variable, and/or to transmit the driver's request, transferred in the signal transmission, into the transformation for determining the change in the deflection of the wheels in the actuation unit.

The steering actuator preferably acts on the steered wheels by means of a rack-and-pinion steering gear.

Figure 2:
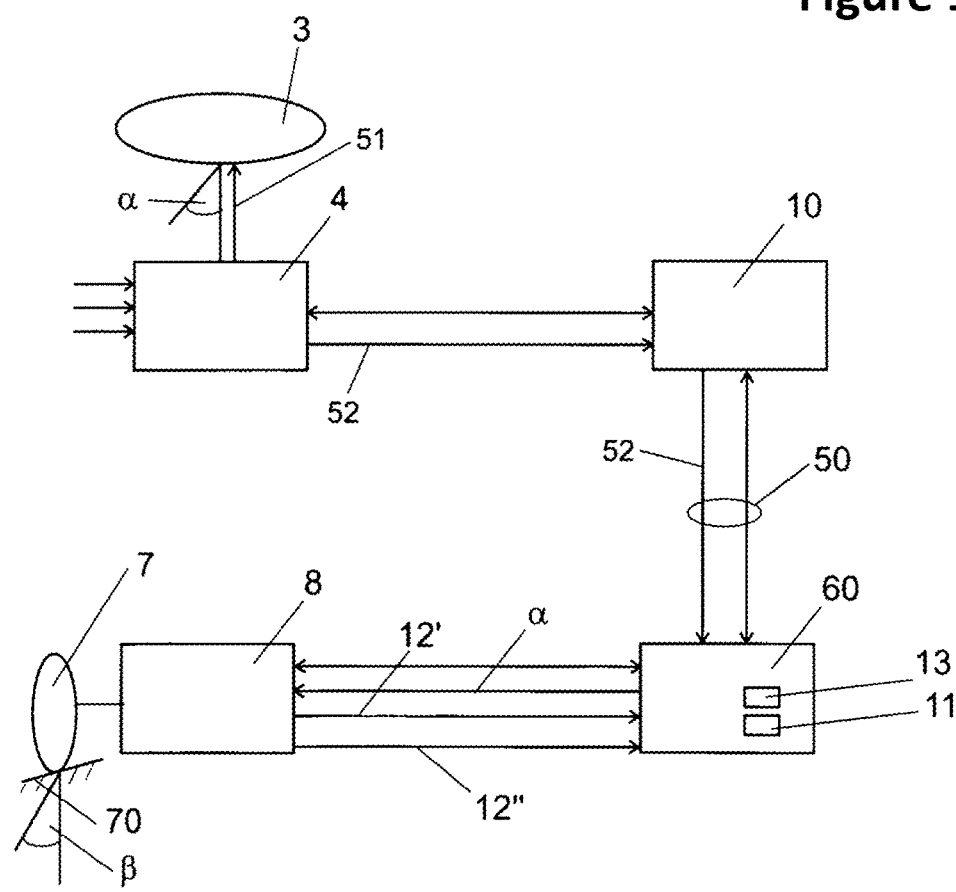
FIG. 2 is a block diagram of the control of a feedback actuator of the steer-by-wire steering system.

A steer-by-wire steering system 1 is shown in FIG. 1. A rotation angle sensor (not illustrated), which senses the driver steering angle which is applied by rotating a steering input means 3, embodied as a steering wheel in the example, is attached to a steering shaft 2. However, a steering torque can also be sensed additionally. A joy stick can serve as a steering input means 3. Furthermore, a feedback actuator 4 is attached to the steering shaft 2, which feedback actuator 4 serves to simulate the reactions of the roadway on the steering wheel 3, and therefore to provide the driver with feedback about the steering behavior and driving behavior of the vehicle. The driver's steering request is transmitted to a feedback actuator monitor unit 10 by means of the rotational angle, measured by the rotational angle sensor, of the steering shaft 2, via signal lines, as is illustrated in FIG. 2. The feedback actuator monitor unit 10 transmits the driver's steering request to the actuator unit 60. The feedback actuator monitor unit 10 preferably also performs the actuation of the feedback actuator 4. The feedback actuator monitor unit 10 can also be embodied integrally with the actuation unit 60. The actuation unit 60 actuates, as a function of the signal of the rotational angle sensor and of further input variables, an electric steering actuator 6 which controls the position of the steered wheels 7. The steering actuator 6 acts indirectly on the steered wheels 7 via a handlebar steering gear 8, such as for example, a rack-and-pinion steering gear, as well as via track rods 9 and other components.

FIG. 2 shows the control of the feedback actuator 4. In a normal situation, the feedback actuator 4 receives signals from, inter alia, the rotational angle sensor which measures and stores the steering angle $\alpha$, the steering angle acceleration and the steering angle speed. The feedback actuator 4 communicates with a feedback actuator monitor unit 10 which controls the feedback actuator 4. The feedback actuator monitor unit 10 receives, from an actuation unit 60 of the steering actuator 6, the actual wheel steering angle $\beta$ of the steered wheels 7, as well as further variables which the actuation unit 60 has determined. A road wheel angle calculation unit 11 determines the actual wheel steering angle $\beta$ of the steered wheels 7 by means of a steering rack position 12" measured at the steering rack 12. In a unit 13 in the actuation unit 60, a steering rack force is measured by means of known methods or estimated. Furthermore, the actuation unit 60 receives driver-side steering commands, such as the steering angle status. The recorded values are stored during a third time period t3.

Figure 3:
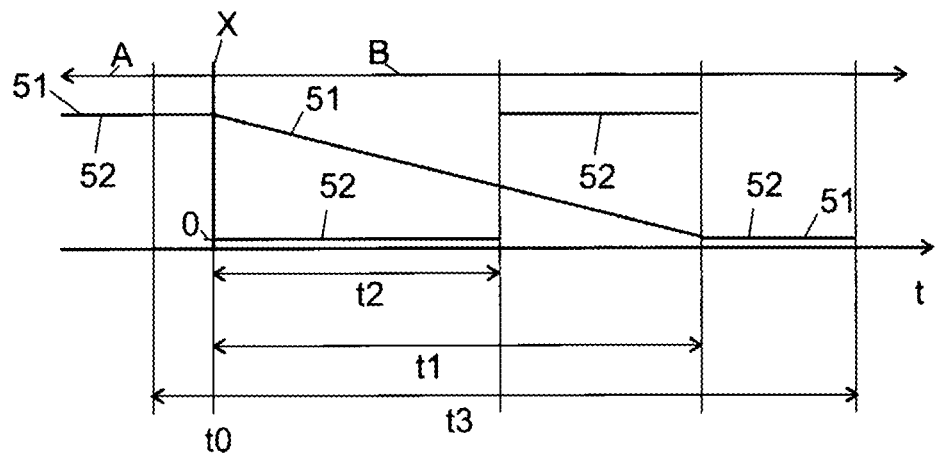
FIG. 3 is a diagram of the time profile of the control method when a fault situation occurs.
Figure 4:
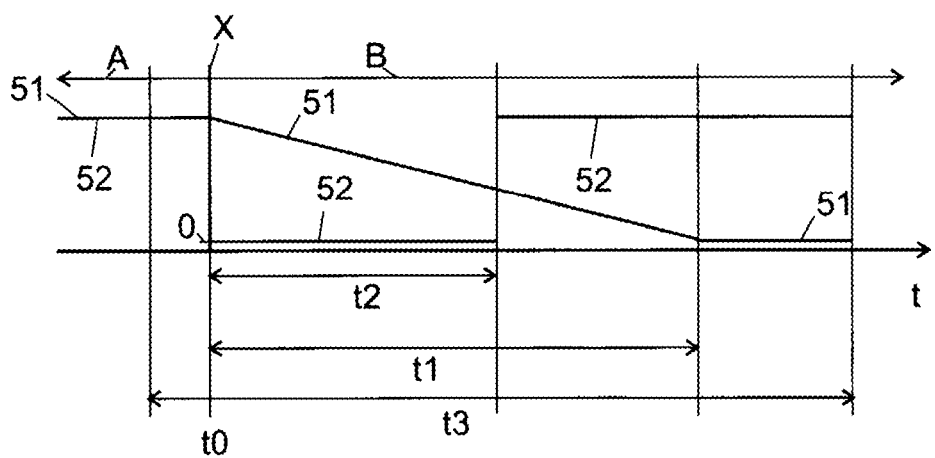
FIG. 4 is another diagram of the time profile of the control method when a fault situation occurs.

FIGS. 3 and 4 illustrate various scenarios for the time sequence of the treatment of a feedback signal 51 and of a driver's request 52 for actuating the steering actuator 6 when a fault situation X occurs.

According to FIG. 3, the steering control takes place 100% with the outputting of the feedback signal 51 during the normal situation A, as normally predefined by the feedback actuator, and the driver's request 52 is transmitted 100% to the actuation unit 60 via the signal line 50, corresponding to the driver's steering request which is applied by the driver to the feedback actuator 4. After the occurrence of a fault situation X at the time t0 with the feedback actuator 4 during a driving state B, the feedback signal 51 to the steering handle 3 is reduced, in the example continuously, and when a threshold value is reached after the expiry of the first time period t1, the feedback actuator monitor unit 10 switches off the feedback actuator 4, with the result that the feedback signal 51 reaches the value 0. The driver continues to receive during this first time period t1 force feedback, albeit reduced force feedback. As a result, it is possible to counteract a force applied by the driver and/or an undesired steering angle which has been brought about at the steering handle 3 as a result of abrupt dropping away of the feedback signal 51. The malfunction of the feedback actuator 4 is transferred by the feedback actuator monitor unit 10 via the signal lines 50 to the actuation unit 60 of the steering actuator 6 which damps the driver's steering request 52, with the result that the steering angle $\alpha$ which is applied by the driver is input only partially or in a reduced form into the calculation for the deflection of the wheels 7. As a result, the actuation unit 60 can counteract, with a damped force or a relatively small torque, the additionally applied and undesired oversteering by the driver.

As illustrated in FIG. 3 and FIG. 4, it may also be necessary to stop the transmission of the driver's request 52 for a second time period t2 in order to prevent the vehicle from veering off, and therefore in order to ensure the safety of the vehicle driver. After the expiry of the second time period t2, it is possible, as illustrated in FIG. 3, to transfer 100% of the signal, which is output by the feedback actuator 4, for the driver's request 52 again to the steering actuator 6 until the expiry of the first time period t1.

Corresponding to FIG. 4 it is illustrated that after the expiry of the second time period t2, 100% of the signal for the driver's request 52 is transferred to the steering actuator 6 until the expiry of the third time period t3.

If a feedback signal is no longer transmitted to the steering wheel 3 after the expiry of the first time period t1, the actuator unit 60 can be actuated on the basis of the information from the measured and stored steered angle β, the steering rack force 12' or steering rack position 12" or the steering angle signals transferred before the fault situation X.

It is also conceivable and possible to execute this actuation on the basis of further variables, such as, for example, the vehicle velocity v, which are measured before the occurrence of the fault situation. This makes it possible to complete, for example, cornering or a parking process. This is made possible by virtue of the fact that the measured variables can still be interrogated by the actuation unit even after the occurrence of the fault situation.

After the expiry of the third time period, the vehicle should be stopped, since after this appropriate steering is virtually impossible if the feedback actuator 4 has not changed back into a functionally capable operating state.

In the case of a partial functional capability of the feedback actuator 4, it is also conceivable and possible after the expiry of the second time period t2, not to reduce the feedback signal 51 to the valve "0" but rather to reduce said feedback signal 51 to a low value and/or to transmit the driver's steering request 52 only to a reduced degree to the actuation unit 60 for the steering actuator 6. The reductions can comprise values from 80% to 20% of the full 100% signal strength.

What is claimed is:

1. A steer-by-wire steering system for a motor vehicle, comprising:
    an electronically controllable steering actuator configured to act on steered wheels of the vehicle,
    an actuation unit,
    a feedback actuator configured such that a user request for a steering angle from a steering input means outputs a feedback signal to the steering input means as a reaction to the request and a driving state of the motor vehicle,
    a signal transmission configured to transfer the request to the actuation unit,
    wherein the actuation unit is configured to actuate the steering actuator to transform the request into a deflection of the steered wheels, and
    a feedback actuator monitor unit configured to detect a malfunction of the feedback actuator as a fault situation,
    wherein the system is configured to operate in the fault situation according to the following method:
        continuously reducing to zero the feedback signal to the steering input means within a first time period, and
        one or more of:
            reducing the signal transmission, and
            interrupting the signal transmission for a second time period, and
            only including the request which is transferred in the signal transmission as a reduced variable in the transformation for determining the change in the deflection of the wheels, and
            omitting the request which is transferred in the signal transmission, for the second time period, from the transformation for determining the change in the deflection of the wheels.

2. The system of claim 1, further comprising:
    one or more of:
        measuring and storing a vehicle velocity, and
        measuring and storing the steered angle of the steered wheels, and
        measuring and storing a position of the steering actuator, and
        measuring or estimating a force of the steering actuator, wherein the force of the steering actuator is stored,
    wherein the stored values are stored for a third time period, and
    actuating the steering actuator on the basis of one or more of the stored vehicle velocity, the stored steered angle, the stored position of the steering actuator, and the stored or estimated force of the steering actuator.

3. The system of claim 1, wherein the second time period is shorter than the first time period.

4. The system of claim 1, including actuating, by means of the actuation unit, the feedback actuator after the expiry of the first time period.

5. The system of claim 1, wherein the driving state of the motor vehicle corresponds to cornering.

6. The system of claim 1, further comprising:
    determining a defined steering angle status based on a steering angle and a steering angle speed applied by the user during travel,
    transmitting the defined steering angle status to the actuation unit, and
    actuating the steering actuator based on the defined steering angle status.

7. The system of claim 6, including:
    determining, when in the fault situation, one or more of the feedback signal, the user request on the basis of the steering angle status which is determined before the fault situation, the measured vehicle velocity, the measured steered angle of the measured position of the steering actuator, and the measured or estimated force of the steering actuator.

8. A steer-by-wire steering system for a motor vehicle, comprising:
    an electronically controllable steering actuator configured to act on steered wheels of the motor vehicle,
    an actuation unit,
    a feedback actuator configured such that a user request for a steering angle can be applied by a user using a steering input means, and which outputs a feedback signal to the steering input means as a reaction to the request and a driving state of the motor vehicle,
    a signal transmission device configured to transfer the request to the actuation unit,
    wherein the actuation unit is configured to actuate the steering actuator in order to transform the request into a deflection of the steered wheels, wherein a feedback actuator monitor unit configured to monitor the feedback actuator and detect a malfunction of the feedback actuator as a fault situation, wherein the feedback actuator monitor unit is configured to reduce, in the fault situation, the feedback signal to the steering input means continuously to zero within a first time period, and one or more of:

reduce the signal transmission between the steering input means and the steering actuator, and interrupt the signal transmission for a second time period, and transmit the driver's request, transferred in the signal transmission, only as a reduced variable, and transmit the driver's request, transferred in the signal transmission, into the transformation for determining the change in the deflection of the wheels in the actuation unit.

9. The steer-by-wire steering system of claim 8, wherein the steering actuator acts on the steered wheels with a rack-and-pinion steering gear.

* * * * *